(12) United States Patent
Barker et al.

(10) Patent No.: US 9,535,228 B2
(45) Date of Patent: Jan. 3, 2017

(54) OPTICAL FIBRE INSTALLATION APPARATUS

(75) Inventors: Philip A Barker, Ipswich (GB); Paul M Andrews, Woodbridge (GB); Graham A Laidler, Ipswich (GB); Keith E. Nolde, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1779 days.

(21) Appl. No.: 11/886,739

(22) PCT Filed: Mar. 29, 2006

(86) PCT No.: PCT/GB2006/001134
§ 371 (c)(1),
(2), (4) Date: Sep. 20, 2007

(87) PCT Pub. No.: WO2006/103419
PCT Pub. Date: Oct. 5, 2006

(65) Prior Publication Data
US 2009/0026429 A1    Jan. 29, 2009

(30) Foreign Application Priority Data
Mar. 31, 2005  (GB) .................................. 0506589.1

(51) Int. Cl.
  *B65H 59/00*  (2006.01)
  *G02B 6/44*   (2006.01)
  *H02G 1/08*   (2006.01)
(52) U.S. Cl.
  CPC .............. *G02B 6/4464* (2013.01); *H02G 1/08* (2013.01); *H02G 1/086* (2013.01)

(58) Field of Classification Search
  USPC ....................................................... 254/134.4
  See application file for complete search history.

(56) References Cited

U.S. PATENT DOCUMENTS

| | | | |
|---|---|---|---|
| 2,729,424 A * | 1/1956 | Eppensteiner | 254/134.3 FT |
| 4,676,310 A * | 6/1987 | Scherbatskoy et al. | 340/853.4 |
| 4,793,048 A * | 12/1988 | Kashiwaya et al. | 29/433 |
| 5,813,658 A * | 9/1998 | Kaminski et al. | 254/134.4 |

(Continued)

FOREIGN PATENT DOCUMENTS

| | | |
|---|---|---|
| JP | 09 197228 | 7/1997 |
| WO | WO 95/23988 | 9/1995 |

(Continued)

OTHER PUBLICATIONS

International Search Report PCT/GB2006/001134.

*Primary Examiner* — Alvin Grant
(74) *Attorney, Agent, or Firm* — Nixon & Vanderhye P.C.

(57) ABSTRACT

A blowing head for installing blown cable, comprising a low-inertia motor using electrical current, operable to obtain the advance of the cable within the blowing head, adjusting means operable to vary the level of current of the motor, and low-inertia sensing means to sense movement and changes in the level of movement of the cable within the blowing head, wherein in use the adjusting means varies the level of current used by the motor in response to changes in the level of movement sensed by the sensing means, and wherein the varying level of current does not exceed a maximum current level.

27 Claims, 17 Drawing Sheets

(56) References Cited

U.S. PATENT DOCUMENTS

| | | | |
|---|---|---|---|
| 6,012,621 A * | 1/2000 | Hoium et al. | 226/35 |
| 6,264,171 B1 | 7/2001 | Hoium et al. | |
| 6,364,290 B1 * | 4/2002 | Barker | 254/134.4 |
| 6,386,512 B1 | 5/2002 | Pecot et al. | |
| 7,225,533 B2 * | 6/2007 | Sylvia et al. | 29/819 |
| 2009/0026429 A1 * | 1/2009 | Barker et al. | 254/134.4 |

FOREIGN PATENT DOCUMENTS

| | | |
|---|---|---|
| WO | WO 98/12588 | 3/1998 |
| WO | WO 99/34492 | 7/1999 |

* cited by examiner

Typical blowing cycle

184

OPTICAL FIBRE INSTALLATION APPARATUS

This application is the US national phase of international application PCT /GB2006/001134 filed 29 Mar. 2006 which designated the U.S. and claims benefit of GB 0506589.1, dated 31 Mar. 2005, the entire content of which is hereby incorporated by reference.

BACKGROUND

1. Technical Field

This invention relates to methods and apparatus for the installation of telecommunications cables, in particular optical fibre installed into pre-installed optical fibre tubes by "blowing" techniques.

2. Description of Related Art

The method and apparatus used to install optical fibre transmission lines into optical fibre tubes or ducts using the viscous drag provided a high-speed flow of a fluid medium, often air, is known from EP108590 and subsequent publications. A blowing head is used for the installation of the optical fibre unit into the optical fibre tubes or ducts. (In this description, references to "fibre" and "fibre units" shall be deemed to include individual fibre members and fibre bundles, and vice versa, as the context allows.)

The blowing head comprises a chamber, into which pressurised air is pumped. The air is directed to flow into the mouth of a fibre tube, and then through the tube which is connected to the blowing head. The fibre unit is initially fed into the tube by a pushing force, so that when there is sufficient fibre surface within the tube for pressurised air to work on, the effects of viscous drag take over at least part of the task of advancing the fibre within the tube.

In use, the blowing heads of the prior art suffer from a number of problems.

First, it was found that the fibre unit was susceptible to buckling during installation. As discussed in EP253636, optical fibre is flexible and necessarily smaller in cross section than the fibre tube it is populating. For example, part of the advancing fibre unit could stop moving within the tube due to excessive friction build up between the fibre and the interior of the tube. A buckle develops if the blowing head continues to drive the fibre unit regardless. A buckled fibre unit could adversely affect the performance of the fibre when installed, or even physically damage it. At the least, buckling would delay the installation process.

This problem of fibre buckle was addressed in EP253636 and WO98/12588, wherein methods and apparatus are described to sense fibre buckle, feed back the existence of a buckle in the fibre unit to the blowing head, and then to use the information to adjust the pushing force driving the fibre forward. In these solutions, the effect of fibre buckle within the tube is "transmitted" back to the blowing head and the fibre unit will buckle into a "buckle cavity". Sensors are located within the cavity to detect the buckle.

JP H04-335604 similarly proposes a method in a magnetic clutch-based blown fibre unit installation system, to use sensed information to control the pushing force applied. The sensing is done not by detecting buckles, but by sensing with an ammeter, the load put on the pushing mechanism during an installation. The aim is to provide smooth and controlled playout of fibre by the blowing head, and thus to avoid buckle. However this method is unlikely to achieve that end as the method and apparatus proposed is not sufficiently responsive nor repeatable owing to a hysteresis loop lag in a magnetic clutch system.

A second problem concerned the amount of air leakage from the blowing head. Air is fed into the chamber of the blowing head under considerable pressure, typically from 5 to 15 bar. This high pressure is required because a fibre tube has a very small internal diameter (typically not exceeding 3.5 mm by today's standards), but may be of very great length: fibre tubes populated by the blowing technique which exceed 1,000 meters are currently not uncommon. The chamber of the blowing head, being comprised of a bore, is typically about 1.1 to 1.2 mm. Air fed into the chamber will seek escape at high pressure from every possible vent and fissure in the blowing head.

Also, not all blowing sessions involved the fibre unit being fed into the mouth of a tube, and to have the fibre emerge at the other end of the tube. Sometimes a blowing session would start from an intermediate point in the intended path of the fibre when installed; this is sometimes known as a bi-directional installation. Such an installation method can be used to populate longer tubes, where the total distance to be covered exceeds that possible in a single blowing session. In brief, one tip of the fibre unit is fed into a first tube and blown in one direction until the end emerges from the far end of the tube; the process is repeated using the other tip of the fibre unit and blowing it in the opposite direction. To cope with the change of blowing direction in bi-directional installations, WO98/12588 shows how the blowing head can be opened along the line of the fibre unit travel, allowing the user to remove the installed fibre after completing the first part of the task. This however means that the blowing head is now made up of typically two halves which have to be sealed shut (e.g. by clamping) during an installation session. There are thus numerous points of escape for the pressurised air: not only at the two ends of the bore making up the chamber (where the fibre unit enters and exits), but also along the seams where the parts of the blowing head meet when clamped shut.

Deformable seals were typically used to defend against air leakage, but these proved to lack durability on account of its exposure to the glass microspheres which coat the protective sheath of a fibre unit or bundle. The glass beads are used on blown fibre units to reduce the friction generated between the fibre and the inside tube surface, as further described in e.g. EP186753. As deformable seals are typically made from rubber or such materials, they are highly susceptible to damage by the glass, making frequent replacement a costly necessity.

As a result of air leakage from the blowing head, the amount available to generate the required viscous drag within the fibre tube decreases. It is thus necessary to employ expensive high-volume air compressors to compensate for the loss of air. In addition to the expense of procuring and operating such compressors to make good the wastage, the weight and bulk of the machinery has necessitated the employment of more than one operative, with associated cost implications.

A third problem arises from developments in the size of fibre bundles (comprising a number of fibre units or members) and the size of fibre tubes. British Telecommunications plc in the UK deploys, or has deployed in the past 18 years, bundles ranging from 2 to 12 fibres members. Tube sizes vary accordingly. It is unknown what other sizes may be adopted in the future. While the blowing heads of the prior art attempt to build in a measure of flexibility in the range of fibre bundles and tubes they can handle, the sheer range in sizes in current use means that a single blowing head capable of handling the entire range of sizes would be cost-efficient and greatly advantageous.

Yet another problem with blowing heads of the prior art has been cost: cost in terms of manufacture and in operation. Up to now, the experience has been that blown fibre has been deployed chiefly in the business or commercial context. This is because the need for fibre-based communications outweighs the cost of obtaining it. For residential users however, "last mile" issues—where ultimate users still use limited bandwidth copper wire in an otherwise all-fibre network—arise in no small part to the cost-sensitivity of such customers.

As a result of lower take up in the residential sphere, there is no real critical mass for the deployment of blowing head. However, it is anticipated that with rising consumer demand, ubiquitous fibre to the home ("FTTH") will become a reality in the United Kingdom and elsewhere in the near future. The provision of a low-cost fibre installation service at high volumes becomes crucial to the provision of this service. Indeed, cost is a major factor in determining the rate of adoption of FTTH.

There is thus a need for a blowing head that can be manufactured at a low price, and which can be operated cheaply. As cost used to be less of a consideration, the blowing heads of the prior art tended to be seen as specialised pieces of equipment tooled from expensive materials. Owing to high levels of air leakage in use, powerful and expensive air compressors had to be used with the prior art blowing heads.

Prior art blowing heads had also to be operated by skilled users. Each blowing session is unique. For example, there are differences in the size of fibre/fibre bundle and tube, length of tube to be populated, the atmospheric conditions (e.g. dewpoint levels affect the quality of the air pumped into the blowing head). The users need to be able to accurately read the conditions to ensure the correct setup of the blowing head. Moreover they need to be alert to the possibility of problems such as fibre buckle, and to take quick remedial steps by making adjustments to the blowing head. Aside from the need for skilled operators, prior art blowing heads required at least two people in an installation session, which was due in part to the need for a large compressor needing more than one person to move and to set up.

In short, prior art blowing heads are too expensive to make and to use, to be sensibly feasible for mass deployment to provide fibre connections to private premises.

BRIEF DESCRIPTION OF PRESENT EXAMPLE EMBODIMENTS

The applicants have now devised a new blowing head which addresses the above problems, to provide a solution to overcome the issues related to fibre buckle, excessive air loss, bi-directional installation, inflexibility in use with different-sized fibre bundles and tubes, and cost.

According to a first aspect of the invention there is provided a blowing head for installing blown cable, comprising a low-inertia motor using electrical current, operable to obtain the advance of the cable within the blowing head, adjusting means operable to vary the level of current of the motor, and low-inertia sensing means to sense movement and changes in the level of movement of the cable within the blowing head, wherein in use the adjusting means varies the level of current used by the motor in response to changes in the level of movement sensed by the sensing means, and wherein the varying level of current does not exceed a maximum current level.

According to a second aspect of the invention there is provided a system for installing cable into a cable tube, comprising a low-inertia motor using electrical current, operable to obtain the advance of the cable within the blowing head, adjusting means operable to vary the level of current of the motor, and low-inertia sensing means to sense movement and changes in the level of movement of the cable within the blowing head, wherein in use the adjusting means varies the level of current used by the motor in response to changes in the level of movement sensed by the sensing means, and wherein the varying level of current does not exceed a maximum current level.

According to a further aspect of the invention there is provided a method for installing blown cable in an installation session using the blowing head of claim 1, comprising the steps of inserting an end of a cable into the blowing head, increasing the level of current to the motor until the cable has advanced through the blowing head, setting a maximum current level for the motor during the installation session, based at least partly on the level of current obtained in step (iii), and maintaining the level of current obtained in step (iii).

The use of a low inertia motor together with means for preventing more than a maximum amount of current (which is set in a way which depends upon the operating environment as will be explained in greater detail below) to be drawn from a power supply, provides a very responsive system which will automatically slow the rate at which the cable is advanced into the tube should it encounter any resistance much greater than that required to advance the tube when it is not encountering any snags. In many circumstances, simply slowing the rate of advance is sufficient to enable the snagging condition to resolve itself and for the installation to then resume normally, but it is ideal if this can be done without increasing the amount of force applied to the cable by the motor (it will be appreciated that without the use of a current limiter, as the motor slows down, the reduction in the back electromotive force (EMF) would tend to cause the motor to draw more current form the power supply and thus increase the amount of force applied to the snagged cable, which is undesirable).

The invention will now be described, by way of example only, with reference to the following drawings in which:

DETAILED DESCRIPTION

Figure 1:
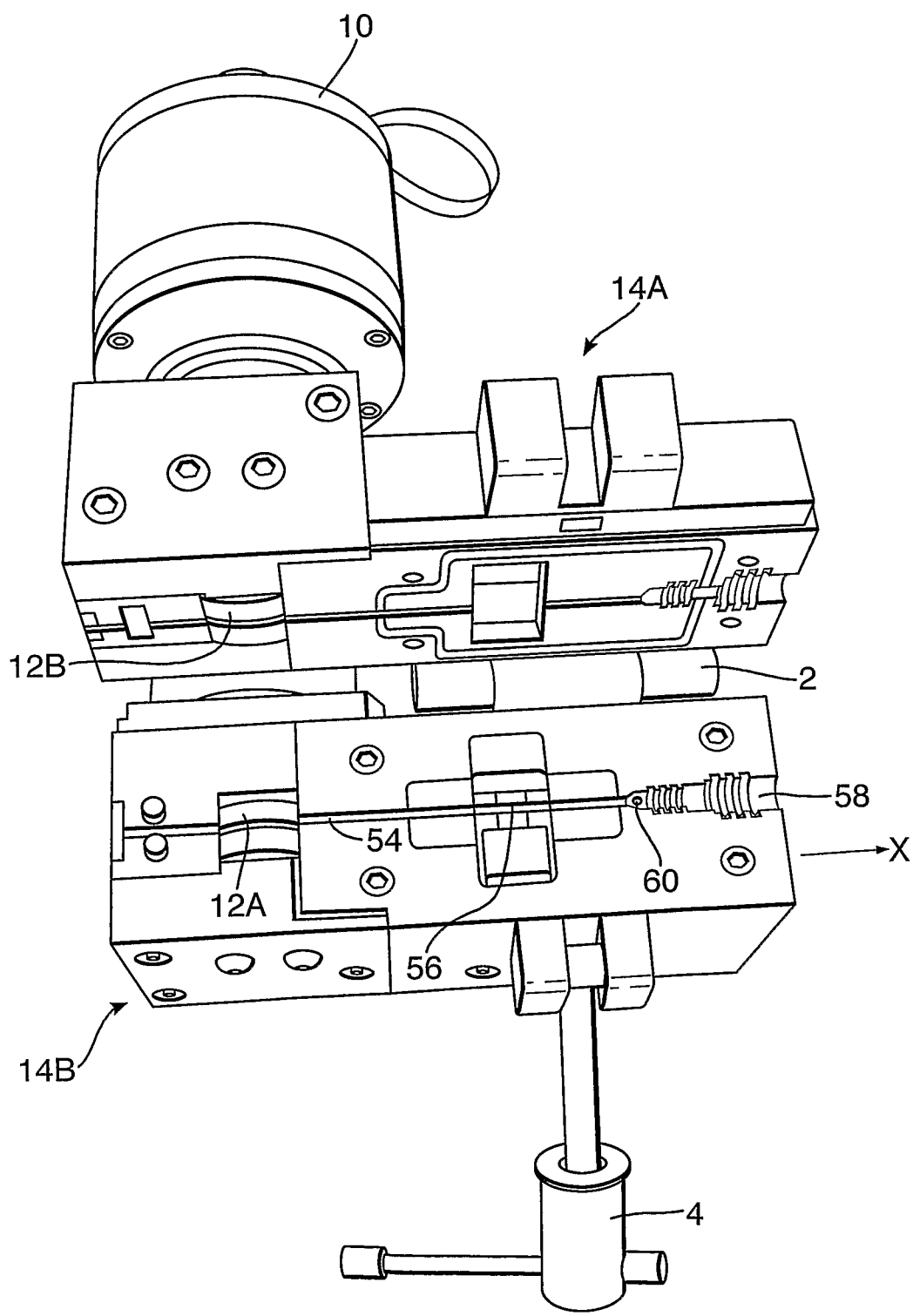
FIG. 1 is a view of the interior of a blowing head according to the prior art.

FIG. 1 is a view of a prior art blowing head which was developed and used by the applicants. In this view, the operative part of the blowing head which feeds and drives the optical fibre units (not depicted) into the optical fibre tube (also not depicted) is open, affording a view of the various parts therein. This operative part of the blowing head through which the fibre unit passes, and the components thereof, shall within this description be collectively referred to as the "air chamber". The two sections of the air chamber are connected by a rotary hinge (2) and can be clamped together with the clamp (4). This "split" two-sectioned design of the air chamber allows for bi-directional installation of blown fibre, as discussed above.

Figure 2:
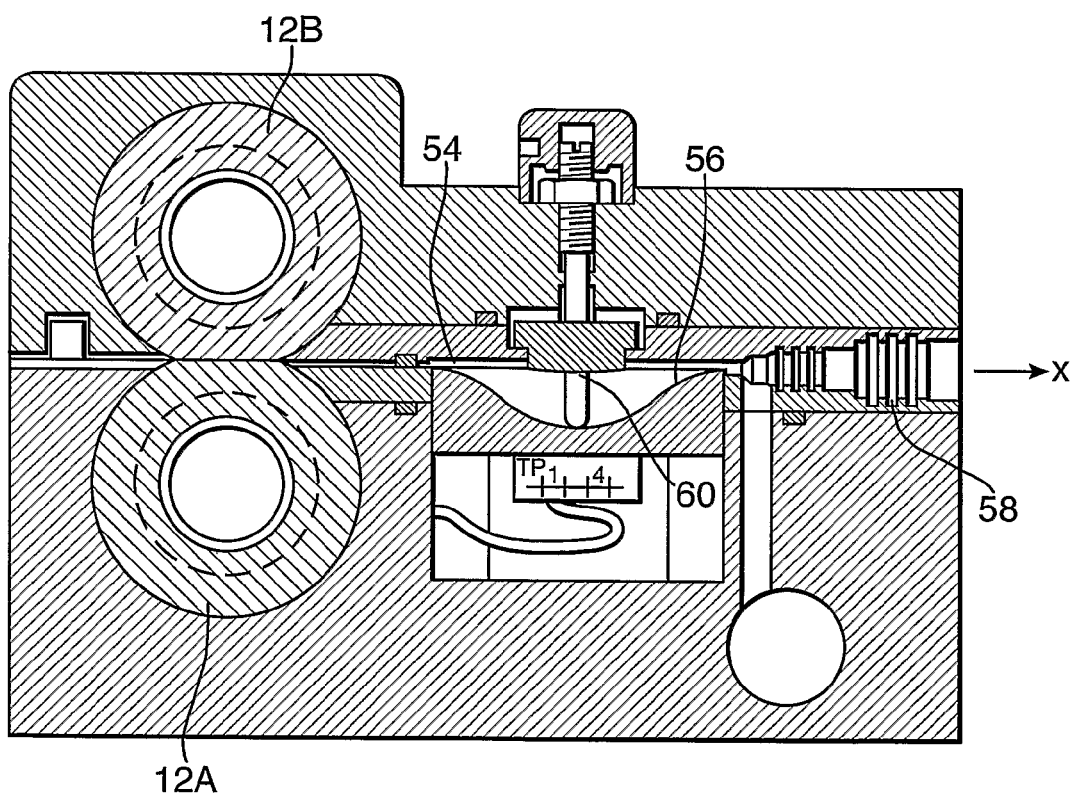
FIG. 2 is a schematic depiction of the blowing head of FIG. 1.

FIG. 2 is a schematic diagram of the prior art blowing head of FIG. 1, and both FIGS. 1 and 2 will now be used to describe the method of operation for blown fibre installations.

The air chamber comprises a bore (54) running through the length of the air chamber. In a typical installation session, optical fibre is laid along the bore path, and the two sections are then clamped together with a clamp (4). The end or tip of the fibre points in the direction described by the arrow X. The fibre tube to be populated is connected to the blowing head at receiving portion (58), typically via a fibre tube connector.

In a blowing session, the air chamber is closed and clamped. A first drive wheel (12A) engages tightly with the second drive wheel (12B), with the fibre sitting therebetween. The motor (10) is turned on to cause the rotation of drive wheel (12A) in the direction of arrow X. The second drive wheel (12B) is not powered by the motor, but being tightly engaged with the first drive wheel, also rotates. Together both drive wheels propel the fibre in the direction described by the arrow X into the waiting fibre tube at the fibre outlet end of the blowing head.

Pressurised air is pumped into the air chamber via the air inlet (60), with the intention that all or most of the air moves at speed into the fibre tube to create the effects of viscous drag along the fibre according to the methods described in EP108590.

The blowing head of FIG. 1 further includes a buckle cavity (56), which operates in a buckle detection system as described in WO98/12588.

Figure 3:
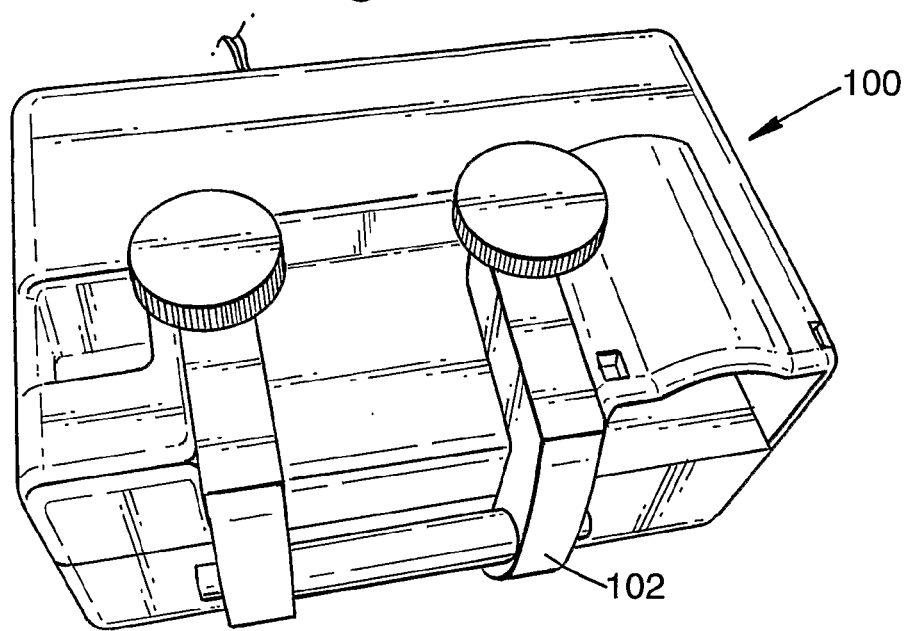
FIG. 3 is an external view of an embodiment of the housing for a blowing head according to the invention.
Figure 4:
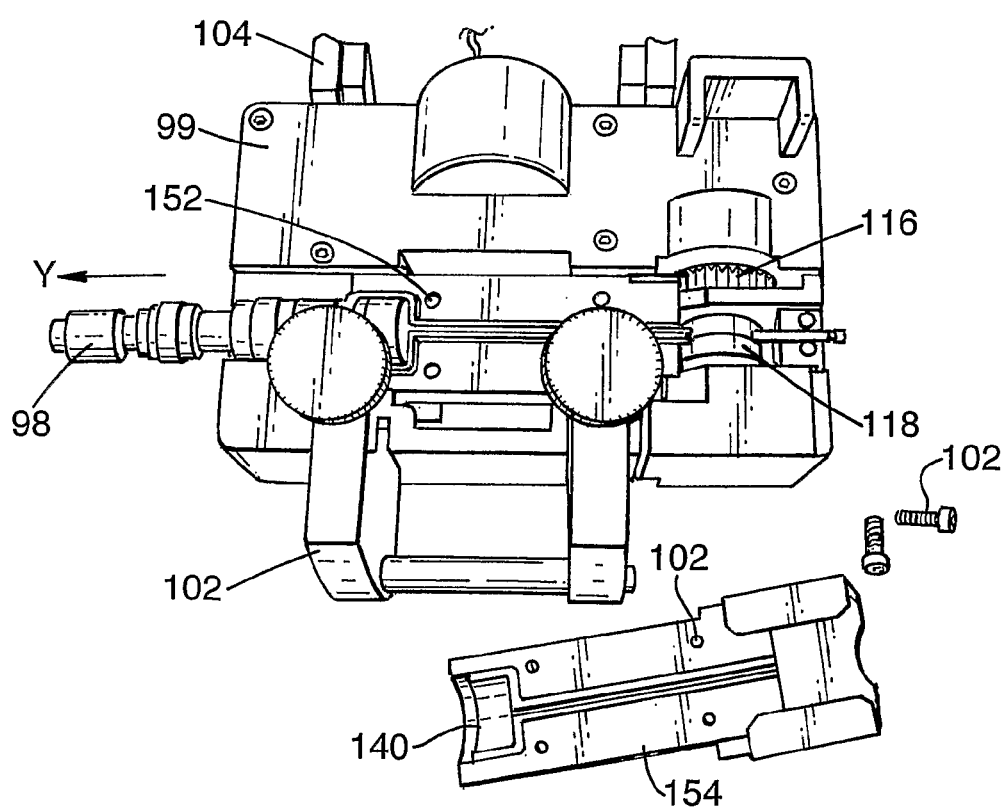
FIG. 4 is an interior view of the blowing head in the housing of FIG. 3.

FIGS. 3 and 4 are respectively external and internal views of an embodiment of the blowing head of the invention.

FIG. 3 is an overall view of the external housing (100) for the blowing head. The housing includes room for the motor and the air chamber. Clamps (102) serve to secure the closed housing. In the prior art blowing head described in connection with FIGS. 1 and 2, the clamping mechanism is all-important to guard against air leakage. In the present invention, the housing clamp is of less significance for this purpose, as shall be explained below in connection with e.g. FIG. 12.

FIG. 4 is an internal view of a blowing head according to invention sitting within the housing of FIG. 1.

The housing in FIG. 2 is "splittable" and designed to allow bi-directional installation. The housing protects the entire blowing head unit, including the motor. The motor is disposed within the housing parallel to the direction of the fibre travel. It is not visible in the drawing, but lies beneath a panel (99). This layout within the housing reduces the overall size and footprint of the blowing head.

As in prior art blowing head of FIG. 1, the motor powers the drive wheels (118, and 120 not seen). Unlike the prior art head however, both drive wheels are separately powered, the power being transmitted to each via a system of gears (116). It will be recalled that only one drive wheel was powered in the prior art blowing head, the second being tightly engaged with the first, so that the fibre unit between the wheels were "crushed" between them as it was driven along the air chamber.

The upper half of the open housing (not shown) is attached to the part which is shown, via hinges (104).

The air chamber is a modular component comprising two parts (152 and 154) which in use is fixed or clamped together. In this figure, one half (152) of the air chamber is shown to be installed into the housing. The air chamber (154) is shown in an unassembled state. One half (152) is shown sitting within its slot in the housing. The two halves can be secured together by screws into screw holes (102), or other securing means. The air chamber can be removed from the housing in its assembled or unassembled state.

In use, the fibre to be installed is laid along the bore path (180) of the air chamber, with the fibre tip pointing in the direction of arrow Y. The fibre tube (not shown) is attached to the blowing head via a tube connector (98) at the receiving portion (140) of the air chamber. The fibre unit is initially pushed through the blowing head by the drive wheels into the tube, and eventually helped along by the additional effect of viscous drag.

Optical Fibre Unit Buckle

We now consider the issues related to fibre buckle during installation of optical fibre using the blown fibre technique. As outlined above, it was found during installation sessions that a thin flexible fibre—even a fibre bundle comprising several fibre members—was susceptible to buckling within the tube. A certain level of flex is acceptable and harmless to the fibre, but excessive buckling sets up compressive or tensile stresses along its length, which could at an extreme, damage the fibre and/or the blowing head. At the very least, buckles delay the installation process.

As discussed above, methods to deal with the problem are described in EP0253636 and PCT/GB97/02507. In both cases, methods and apparatus were developed to sense fibre buckle, to feed this back to the blowing head, wherein the information is used to adjust the speed of the wheels driving the fibre forward. As a result, buckle detectors were used either in conjunction but separately from the blowing head (e.g. EP253636 with EP108590) or together in a single integrated blowing head (e.g. WO98/12588).

The detection method adopted by the applicants for use in the blowing head of FIGS. 1 and 2, was based on the photo-detection of buckling fibre units within the buckle cavity. While this method generally worked well, it was found to be high-maintenance, owing to the delicate nature of the glass optical sensors. Also, as optical fibre is coated with tiny glass beads (further described in e.g. EP186753), these may fall off in the buckle cavity chamber as the fibre passes through the unit. Detection performance is impaired when the glass beads create dust coating the optical sensors.

A blowing head incorporating buckle detectors necessarily increased the bulk and weight of the installation equipment. While this is might be acceptable for installations in the past (cost being relatively less of a consideration), the advent of FTTH creates a pressing need for a more economical solution with more lightweight and compact equipment that can be managed by fewer personnel.

Figure 5A:
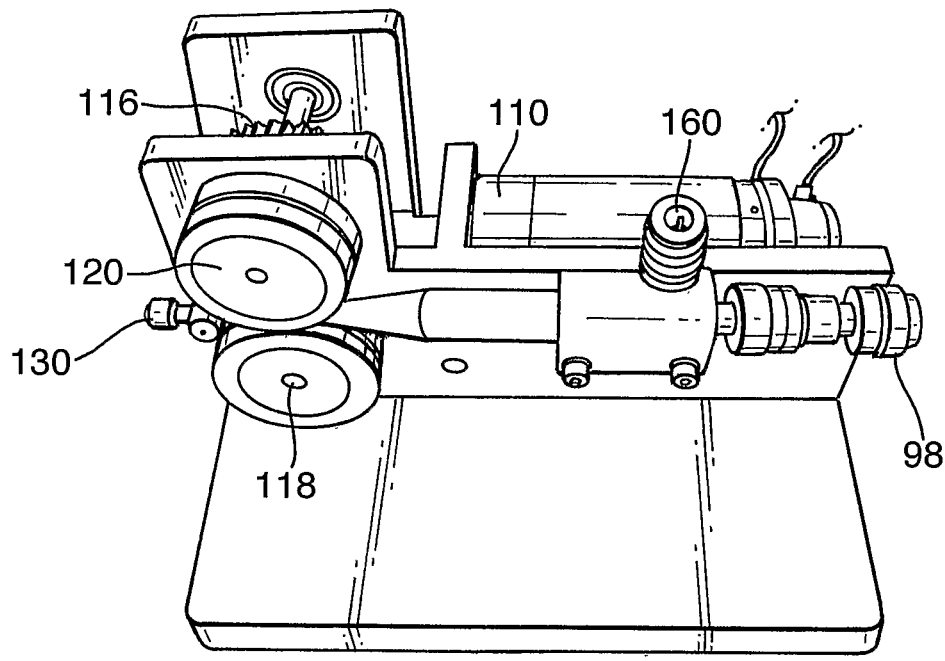
FIGS. 5A and 5B are views of an embodiment of the main operational parts of a blowing head according to the invention.
Figure 5B:
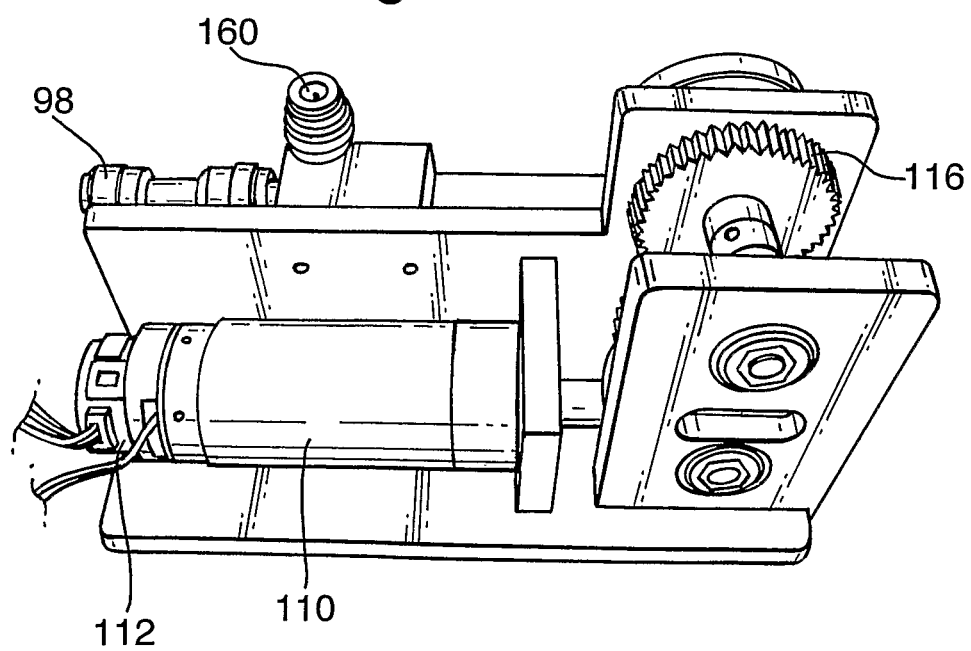

FIGS. 5A and 5B depict the "front" and "back" views of an embodiment of the blowing head (without its outer housing).

This embodiment is slightly different from those shown in FIGS. 3 and 4. Here, the air chamber is a single unitary "unsplittable" piece (150). (This blowing head thus cannot be used for bi-directional blowing.)

As described above, the fibre is installed in the direction of the arrow Y. There are a number of ways to initially insert the fibre into the blowing head so that the fibre unit extends through the air chamber and part-way into the fibre unit tube. First, the fibre tip can be manually inserted into the fibre unit inlet (130) by the operative, and pushed until it urges against the drive wheels (118 and 120). At that point, the fibre unit can continue to be pushed manually through to the fibre outlet section: this is possible because the two drive wheels only lightly touch each other—indeed they may not touch at all. This contrasts with the drive wheels of the prior art blowing head which tightly engage each other, imparting a "crushing force". As an alternative to manually pushing the fibre unit all the way through the air chamber, the motor (110) could be programmed to take over this part of the operation, described below in connection with FIG. 7 (under "Load Fibre"). Yet another way, when using a "splittable" air chamber as discussed above in connection with e.g. FIG. 4, is to open up the air chamber and to lay the fibre along the bore path (180) with the tip pointing in the direction of arrow Y, then close the air chamber and the housing up before blowing.

At the other end of the blowing head at the fibre outlet end, a tube connector (98) is fitted onto the air chamber (150); the fibre tube (not shown) is fitted to the tube connector. There is thus described a continuous path from the fibre inlet (130) to the fibre tube.

In use, the motor (110) is started up, which powers both drive wheels (118 and 120), via the gear arrangement (116) in the direction of the arrow Y. In this embodiment, the gear ratio is 4:1. Although a range of gear ratios is possible, the system works optimally in a low-inertia environment.

As the drive heads start moving the fibre in the direction of arrow Y, air can be pumped into the air chamber via the air inlet (140). During the early stages of installation session, the drive wheels continue to push the fibre into the tube. Indeed a large part of a typical session would require the pushing effects of the drive wheels at least in part to secure the advance of the fibre unit into the tube.

It will be noted that there is no buckle detection system in the blowing head according to the invention. JP H04-335604 (supra), proposes a method to avoid fibre buckle without using a buckle detection system, but as discussed, the method is unlikely to achieve its aim in a magnetic clutch-based system with hysteresis lag and system inertia.

The applicants on the other hand, have found that by capping the current to be applied to the motor during the installation session, in conjunction with a low-inertia motor and drive wheel system, their apparatus and methods does significantly reduce buckle occurrence.

Figure 6:
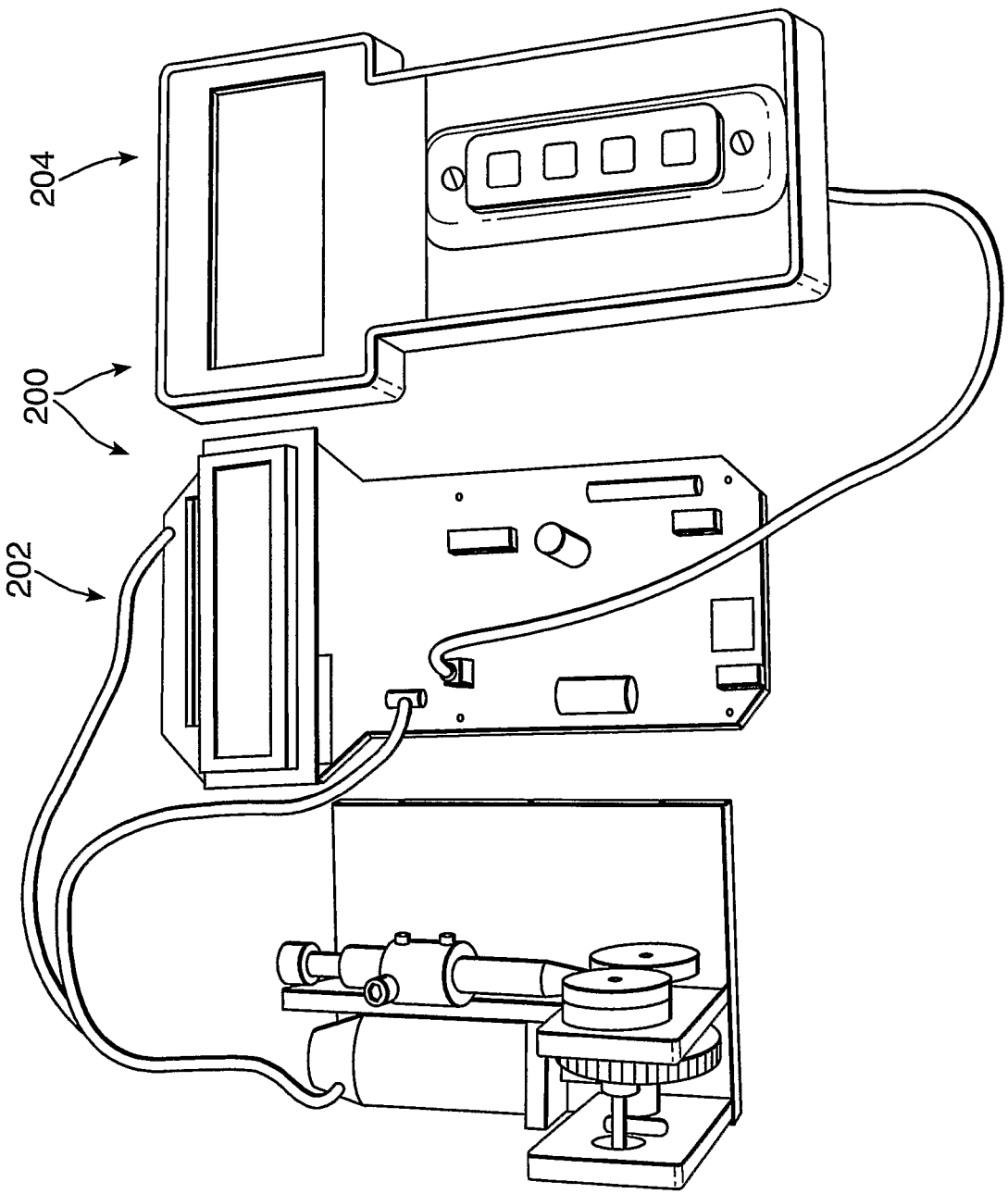
FIG. 6 depicts the embodiment of FIG. 5A and an embodiment of a control unit therefor.

FIG. 6 shows the blowing head of FIG. 5A and the components of a control unit (200) with which a user controls the installation session. A control unit including a microprocessor is a preferred way of allowing a user to control the installation session. It is however within the scope of the invention for a skilled and experienced operative to control the session manually without using such a control unit, wherein the operative decides how the installation should proceed. In such a case, different means of control—such as control means directly on the blowing head itself, or remote control means.

Figure 7:
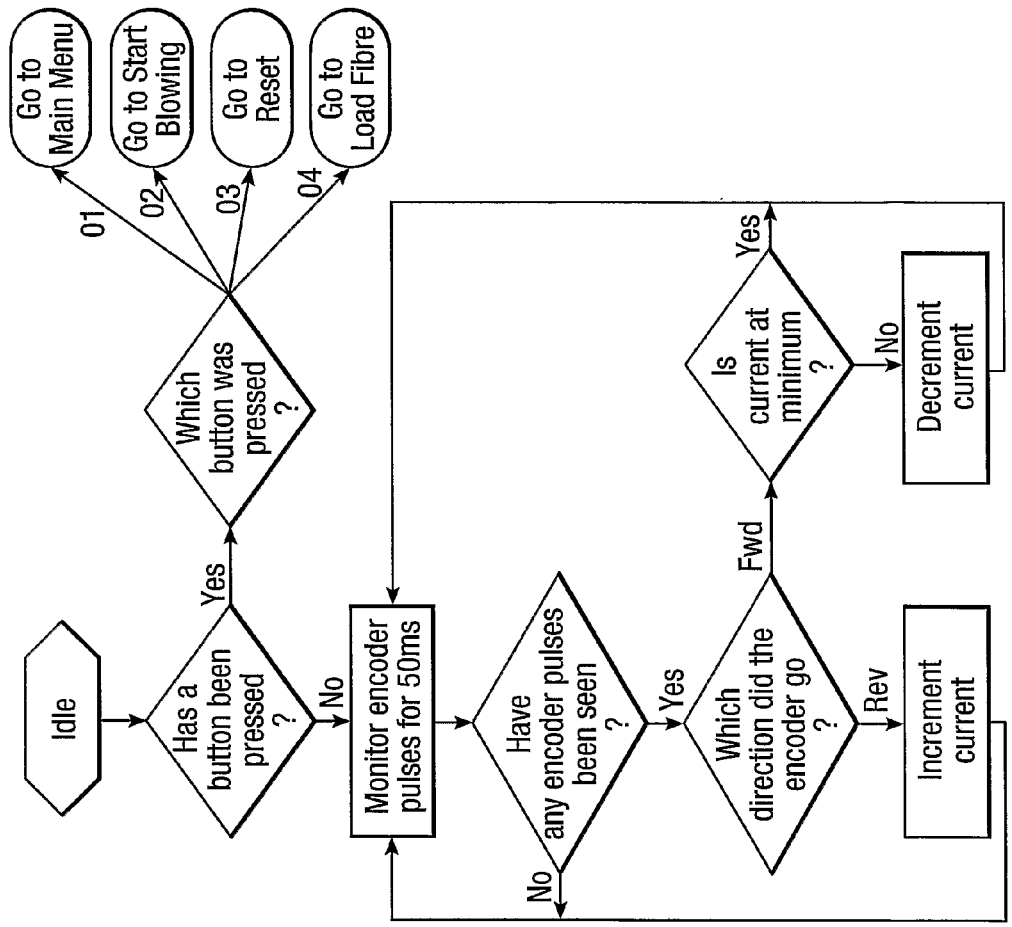
FIG. 7 is a flowchart showing the initial start up sequences of a control unit according to the invention.
Figure 7:
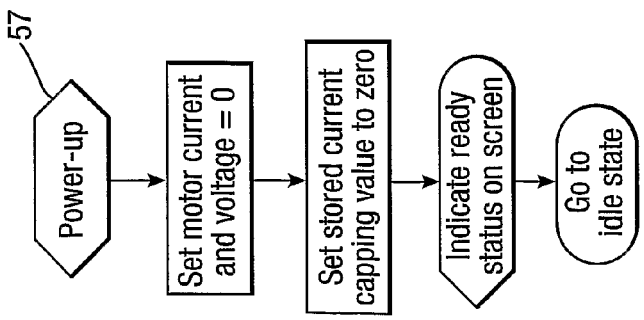

In this embodiment, the unit cover (204) includes buttons to allow the user various options, such as those discussed below in connection with FIG. 7. The body of the control unit (202) comprises a printed circuit board and a display screen. This embodiment shows the control unit to be of a handheld size, and wired to the blowing head. The skilled person would appreciate that any number of variations are possible concerning the size of the control unit and how it is connected to the blowing head.

According to the invention, voltage levels determine the speed of fibre movement, while current levels are used to control the amount of force output by the motor. Voltage levels are typically pre-set prior to the start of an installation session, but can be varied during the session, e.g. to correct speed of installation.

The varying of the voltage to control motor speed is achieved in the present embodiment using pulse width modulation (PWM). PWM is also used to control the maximum current supplied to the motor. The PWM control signals are generated by a microprocessor. An analogue comparator is used to compare the current drawn by the motor with the maximum permitted by the microprocessor and in the event that more than the maximum amount set by the microprocessor is detected as being drawn, the switching of the output state of the comparator causes the flow of current through the motor to be hindered, thus preventing it from rising above the maximum allowed value.

Figure 8:
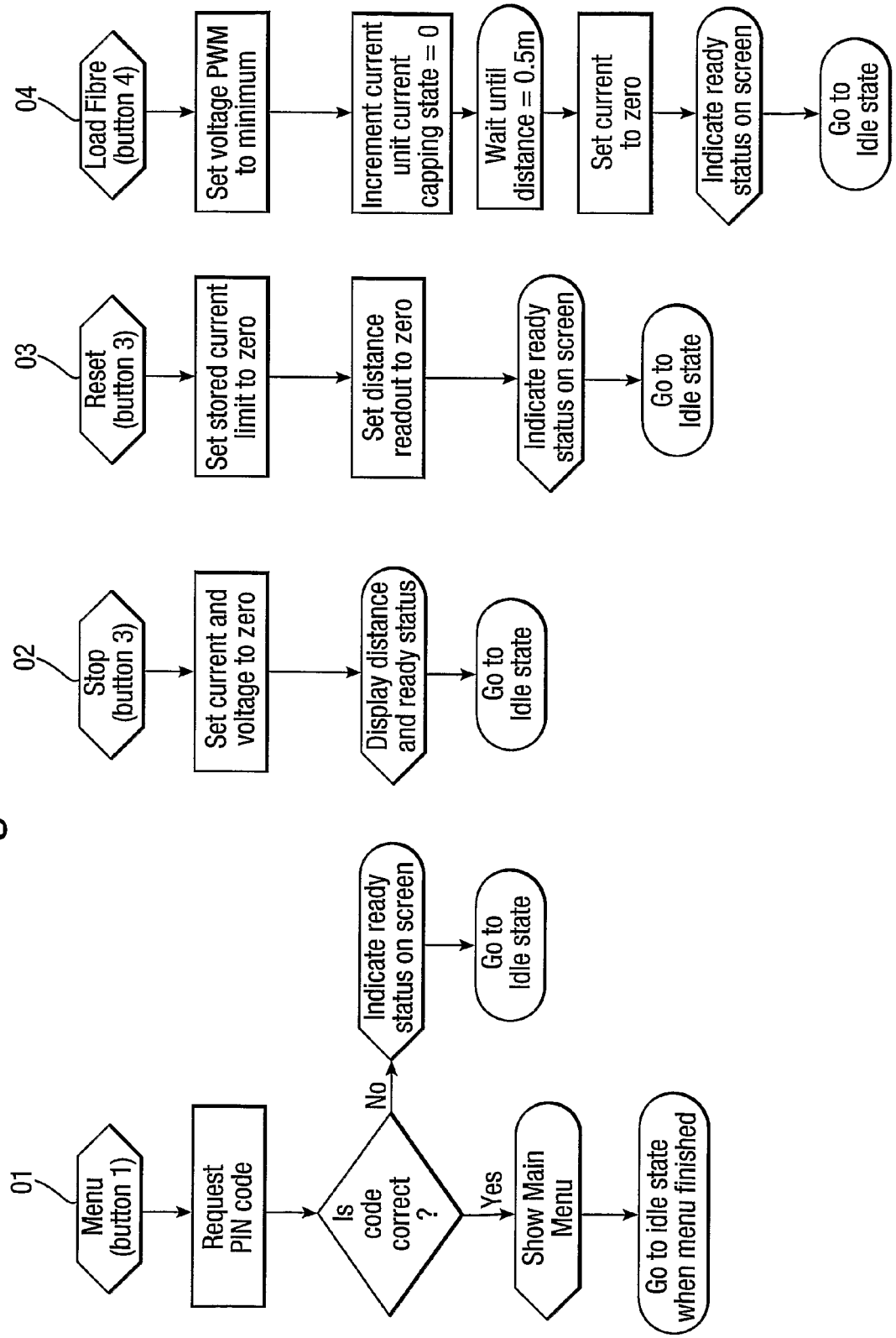
FIG. 8 is a flowchart showing the control unit sequences of operations available to a user.

FIG. 8 shows flowcharts for the preliminary steps which the control unit goes through. At the start of a typical installation session (session S7), the motor is powered on and in an idle state with voltage and current levels at zero, and pressurised air is fed into the air chamber. The fibre to be installed is, or has been, fed all the way or part-way into the blowing head as described above. If operative decides to use the motor to load the fibre unit into the fibre tube, he can select the option "Load Fibre" (option O4) as more fully discussed in FIG. 8 below.

The user then makes a selection on the control unit to start the installation of the fibre, by pressing a button. In this embodiment of the control unit, the user controls the installation session with four options: "Menu" (O1), "Stop" (O2), "Reset" (O3) or "Load Fibre" (O4). The sequences for these options are shown in FIG. 8. (To clarify: option O3 is in this embodiment both the "Start Blowing" as well as the "Stop" routine.)

An encoder (112) monitors the motor activity throughout the session. This device serves to detect and feedback to the microprocessor controller the level of motor activity (e.g. in terms of mechanical rotations), to provide input for the control software to process. An E4 optical rotary encoder (e.g. from Trident Engineering; their technical specifications for this item are at http://www.tridenteng.co.uk/media/pdf41add17df22ed.pdf) is mounted on the motor in the present embodiment of the invention on account it being small, but any similar device performing the same function can be used.

As long as no selection is made by the user, the motor continues in its idle/"ready" state. When the user selects "Start Blowing" (O2) on the control unit, motor current is gradually increased, until the pushing power transmitted to the drive wheels causes the fibre to start moving. When the fibre moves, the level of current at that point is sufficient to overcome all the forces preventing fibre movement—such as friction within the air chamber, inertia of the drive wheels and the gear arrangement, as well as the "piston effect" of the air escaping under pressure in a direction opposite to the desired fibre movement.

This level of the current required to start fibre movement is captured by the control circuit, and used by the controller to calculate a cap on the current level. This cap on the current is thereafter used to prevent excessive pushing by the motor for the duration of the installation session. After the end of the installation session, the current capping value is discarded, so that a new value is set for each installation session.

There are significant benefits to this method of capturing the value of the current level required by the motor to obtain fibre movement at each installation session. As noted above, the blowing conditions are different for each session—depending on factors ranging from the route length and topology, to the size of the fibre and tubes themselves. A blowing head having a factory-preset level of pushing force would not be able to optimise the session based on such conditions. A highly experienced operative may be able to obtain good results, but such personnel would be expensive.

If a blowing session is abandoned midway (i.e. when the fibre is only part-way installed), or in a bi-directional installation session, the current cap value can be reset when the session resumes/starts again. It would however be obvious to the skilled person that alternatives are available, such a discarding a current cap value only if the session is not resumed within a certain period of time.

To obtain the value for the current level cap, the applicants have adopted a practice of adding about 12.5% to the current level required to start fibre movement within the blowing head. This serves to allow for fluctuations and variations in the blowing system as well as in the blowing environment and conditions. This figure is of course a mere rule of thumb, and the scope of invention would include current levels caps derived from other values added to, or indeed deducted from, the level required to start fibre movement.

Figure 9A:
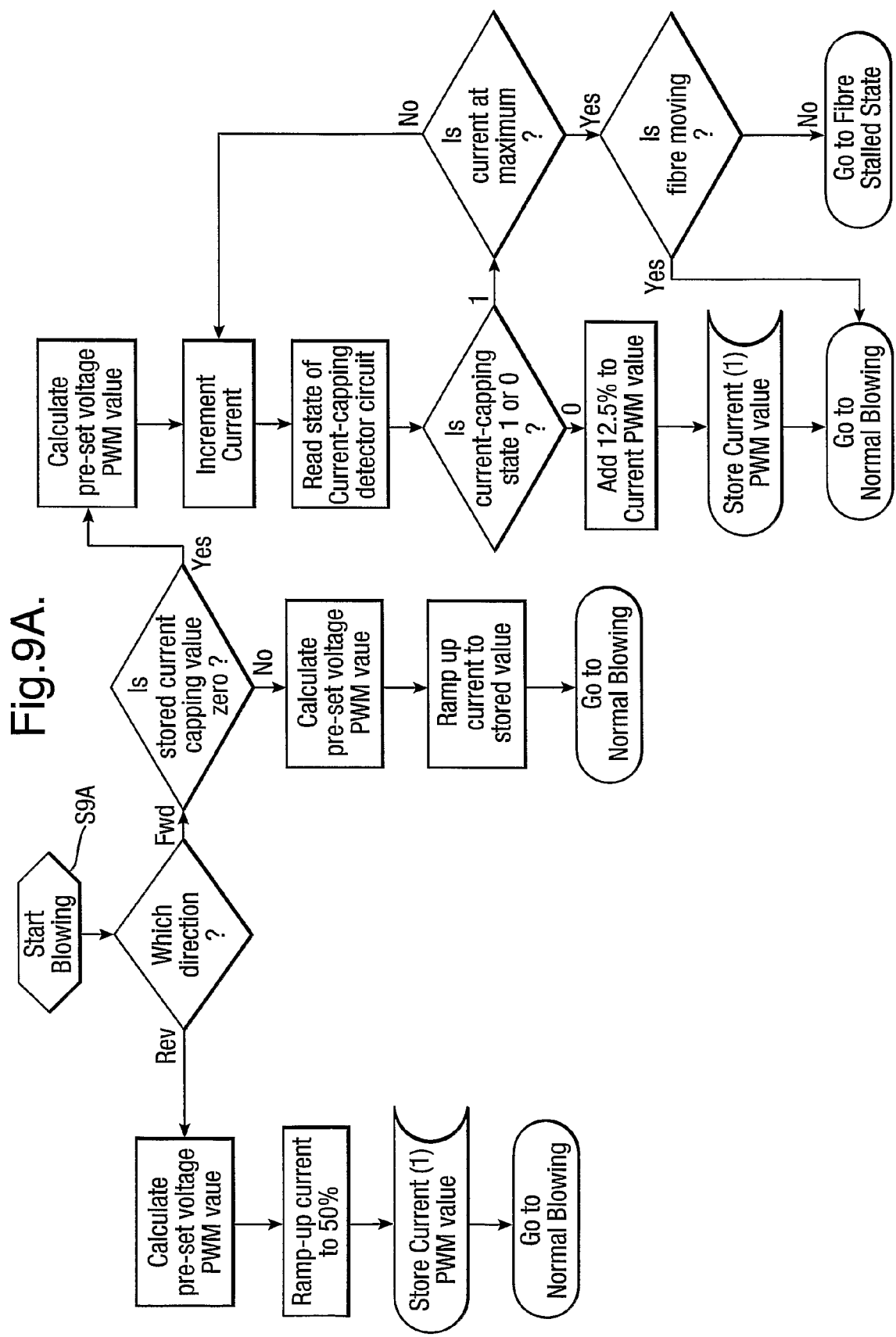
FIGS. 9A, 9B and 9C are flowcharts showing installation sequences of the control unit.
Figure 9B:
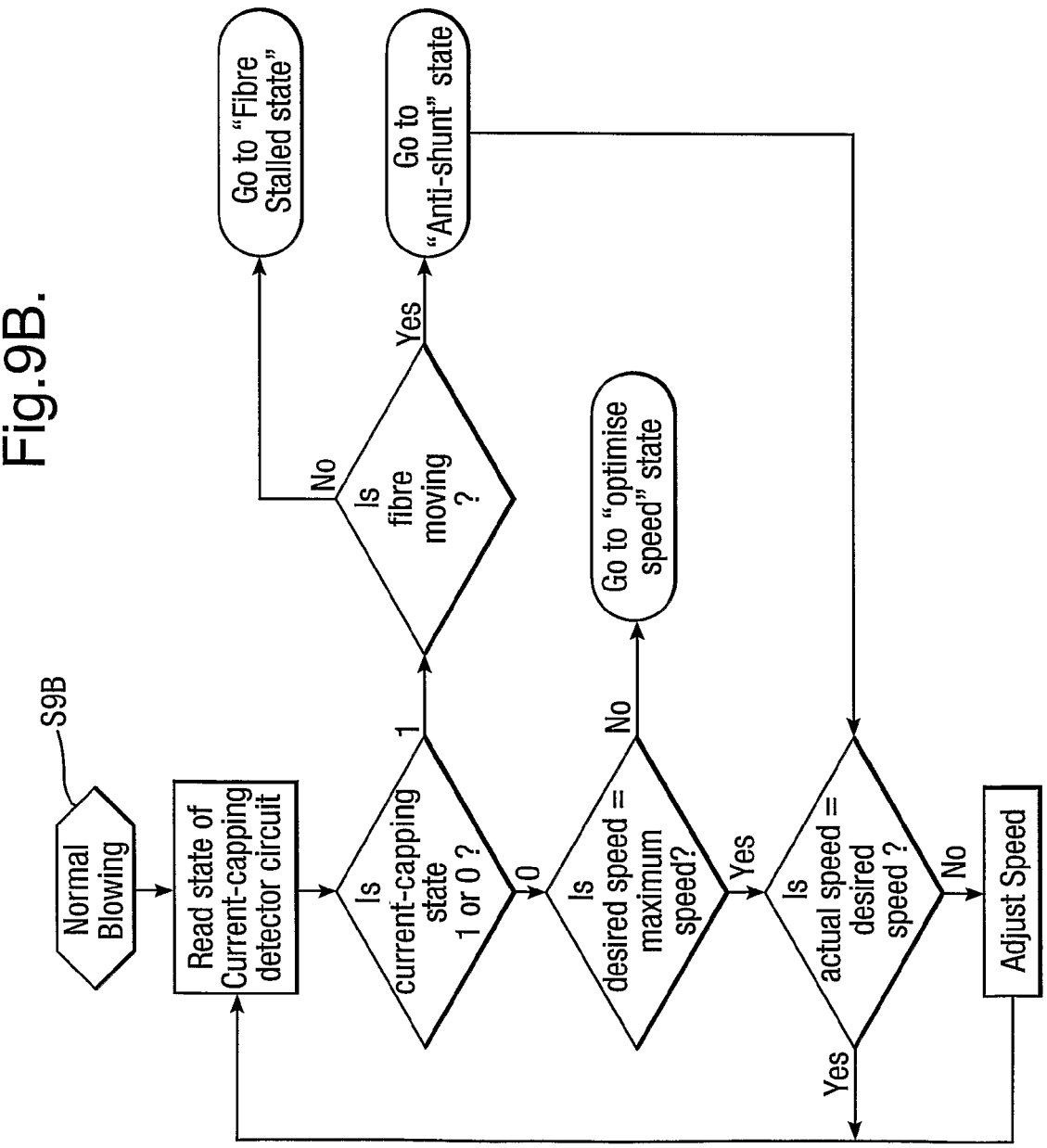
Figure 9C:
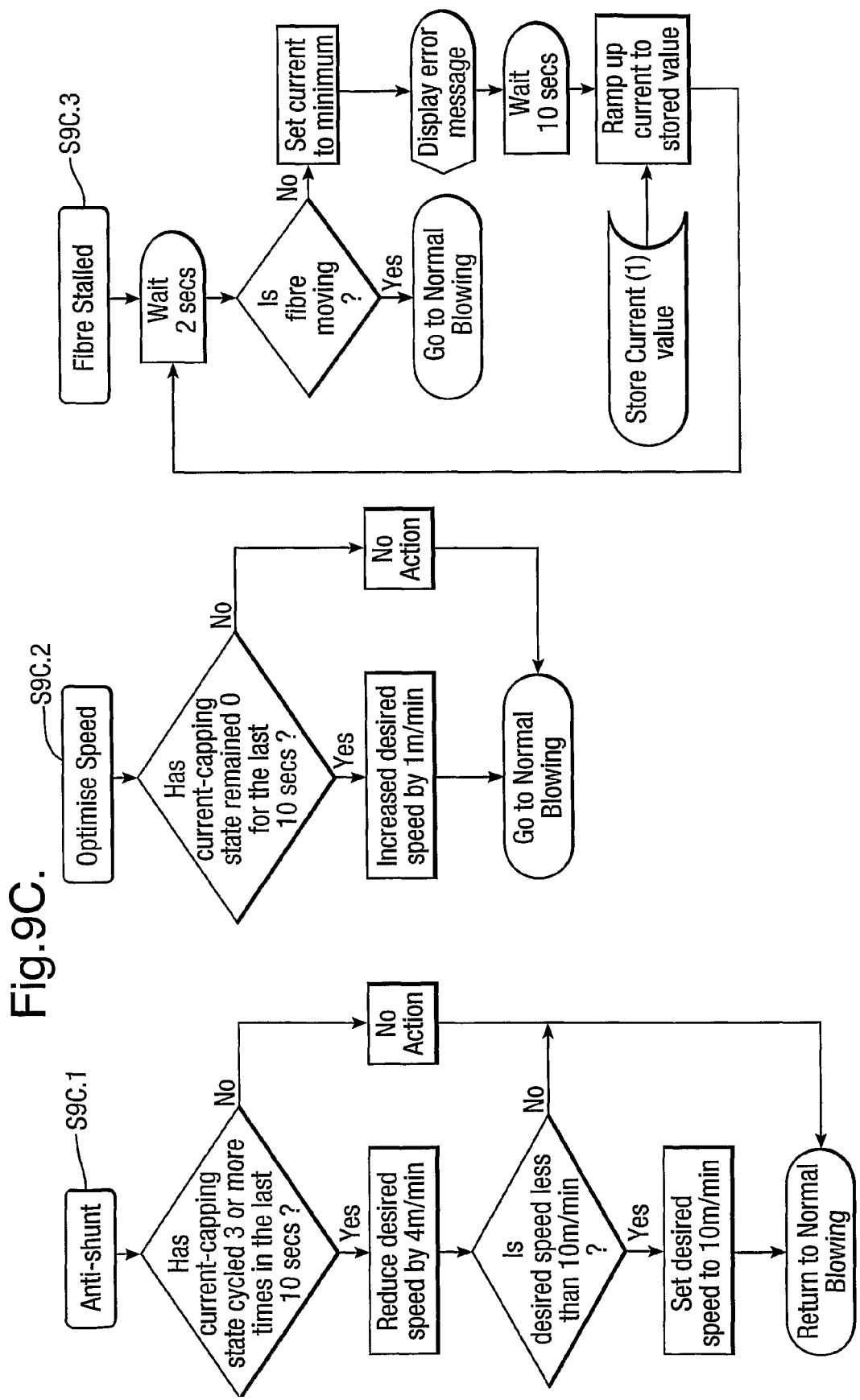

The steps involved in the installation process are further described in the flow charts of FIGS. 9A to 9C in particular, how the processor in the control unit would order the flow events in the various expected installation conditions, being "normal" (the usual blowing session) or "abnormal" (when problems develop during the session).

FIG. 9A describes the start of an installation session (S9A) and how the current capping value for the session is derived. The variety of expected situations and applications can be seen for example from the step where the blowing head is run in the "reverse" direction (e.g. to empty out a populated tube, or where the fibre unit needs to be recovered from a stalled position within the tube). The skilled person would be able to envisage other options which may be useful to include.

The flow chart of FIG. 9B shows the steps involved in a "normal" installation session (S9B). The processor of the control unit repeatedly checks if the current drawn by the motor has reached the capped value, and as long as it has not exceeded the cap, the motor will keep powering the drive wheels, which in turn keep pushing the fibre through the blowing head and into the fibre tube.

Current levels vary during an installation session as the amount of force required to push the fibre vary. For example, fibre speed increases on account of the effects of viscous drag taking over during the installation session, the level of current needed by the motor drops. Conversely, the amount of pushing force required will increase if the fibre is stalled or if fibre movement reduces—this will increase the current required by the motor. The effect of the current cap is that the motor will not output excessive force by excessively pushing the fibre, thus reduce the probability of excessive buckling.

This method of controlling the output of force by the motor is to be used in a low-inertia system, so that the motor, gear arrangement and drive wheels are as responsive as possible, to maximise sensitivity to changes in fibre movement during installation.

In practical terms therefore, if the fibre stops moving, the current levels of the motor will quickly increase in response. If the level reaches the capped value, the motor will stop outputting the pushing force, and the drive wheels stop pushing the fibre into the fibre tube. Here, the user will select the button 3 on the control unit for the "Stop" sequence (O2 in FIG. 8), and then possibly the "Reset" (O3) sequence to ready the system to resume installation.

As long as the current does not exceed the capped value, the system deems that the fibre is being installed smoothly and without excessive buckle into the tube. Optionally, a user may choose to optimise—i.e. increase—the installation speed in the manner described in FIG. 9B and the "Optimise Speed" procedure (S9C.2) in FIG. 9C.

If the fibre stops moving between the drive wheels, this change in fibre movement status will transmit rapidly back to the motor in the low-inertia system via the drive wheels. The control unit will go into a "Fibre Stalled" state (FIG. 9C, S9C.3) where the controller will drop the current level to the motor, as the system waits 10 seconds for the buckle or blockage to clear. The current is then ramped up to the cap value and another short pause takes place while the system awaits information that the fibre is moving again from the drive wheels. The applicants have incorporated this procedure, having found that the obstructed fibre may free itself with the assistance of viscous drag within the fibre tube.

Where the fibre continues to move, but where a undesirably high level of force (resulting in the current levels reaching the capped value) is required to obtain the movement, the controller goes into a "Anti-Fibre Shunt" state (FIG. 9C, S9C.1). Here, the assumption is that conditions within the fibre tube do not at that point allow for smooth playout of fibre into the fibre tube, possibly a precursor of fibre buckle. The controller reduces the voltage of the motor to reduce the speed of the drive wheels. If need be, the controller will loop the procedure so that the speed will continue to reduce until the fibre again installs smoothly into the tube. This flow chart also includes in a preferred embodiment the option of allowing the user to set a "desired speed"—here it is given as 10 meters per minute.

Figure 10:
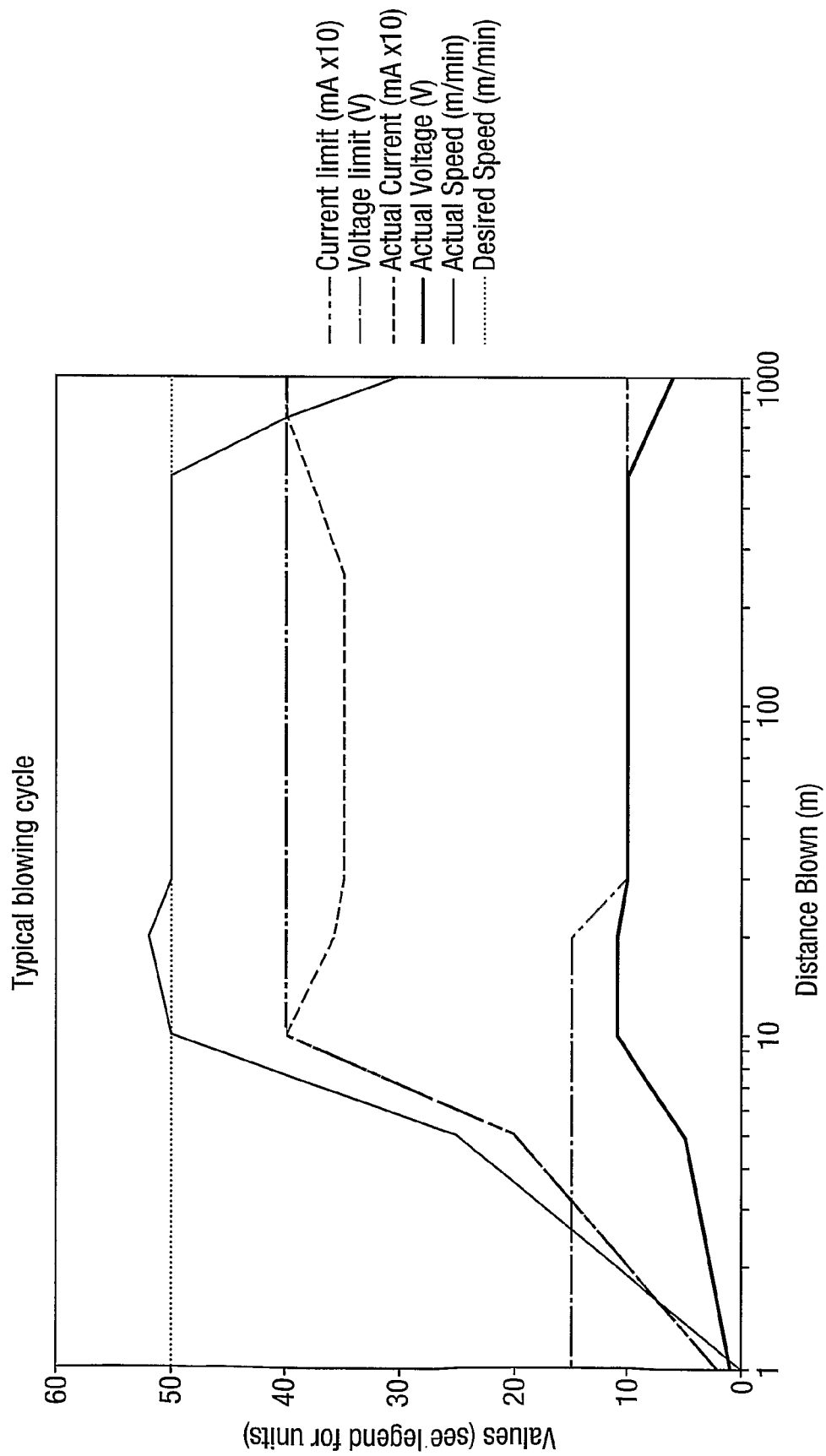
FIG. 10 is a graph showing levels of various performance measurements during a typical installation session using a blowing head of the invention.

FIG. 10 is a graph depicting various values measured over time during a typical blown fibre installation session over a route of 1000 meters, using apparatus and methods according to the invention. Here, the fibre unit is pushed into the tube by the force of the motor powering the drive wheels for the first 10 meters. From that point to about 600 meters, the installation is partly helped by viscous drag as they come into effect. The level of current decreases at this stage. After 600 meters, the amount of air in the tube is low, and the friction levels between the fibre and the tube have risen. The effects of viscous drag level off at that distance from the blowing head, and the motorized drive wheels again play more of a part in driving the fibre along the tube. At this stage, the current levels rise until they reach the cap value where it will remain for the rest of the session. Accordingly, the speed decreases as the control software cycles the voltage down (e.g. S9C.1 in FIG. 9C).

Excessive Air Leakage

One of the greatest problems in using the prior art blowing head of FIG. 1 is the high level of air loss in use. Typically, it has been found that at an air pressure of 10 bar, about 80 litres of air could be lost from the air chamber. Part of the reason for the level of leakage in this blowing head stems from the fact that the head is developed for bi-directional installation. The air chamber has more points for air to escape, especially along the long side parallel to the direction of fibre travel, compared to one which is a single unitary piece, like the air chamber depicted in FIG. 5 above, where the leakage is confined to the fibre inlet (130) and fibre outlet (140) regions.

As noted earlier, a consequence is that very large and powerful air compressors need to be used with such blowing heads, to make good the deficiency. With the drive for inexpensive, mass-deployment blown installations in FTTH, this level of loss is unacceptable. At the same time, the need for an adaptable piece of equipment adaptable for both bi- and single direction blowing is as great as the requirement to reduce air loss.

Figure 11:
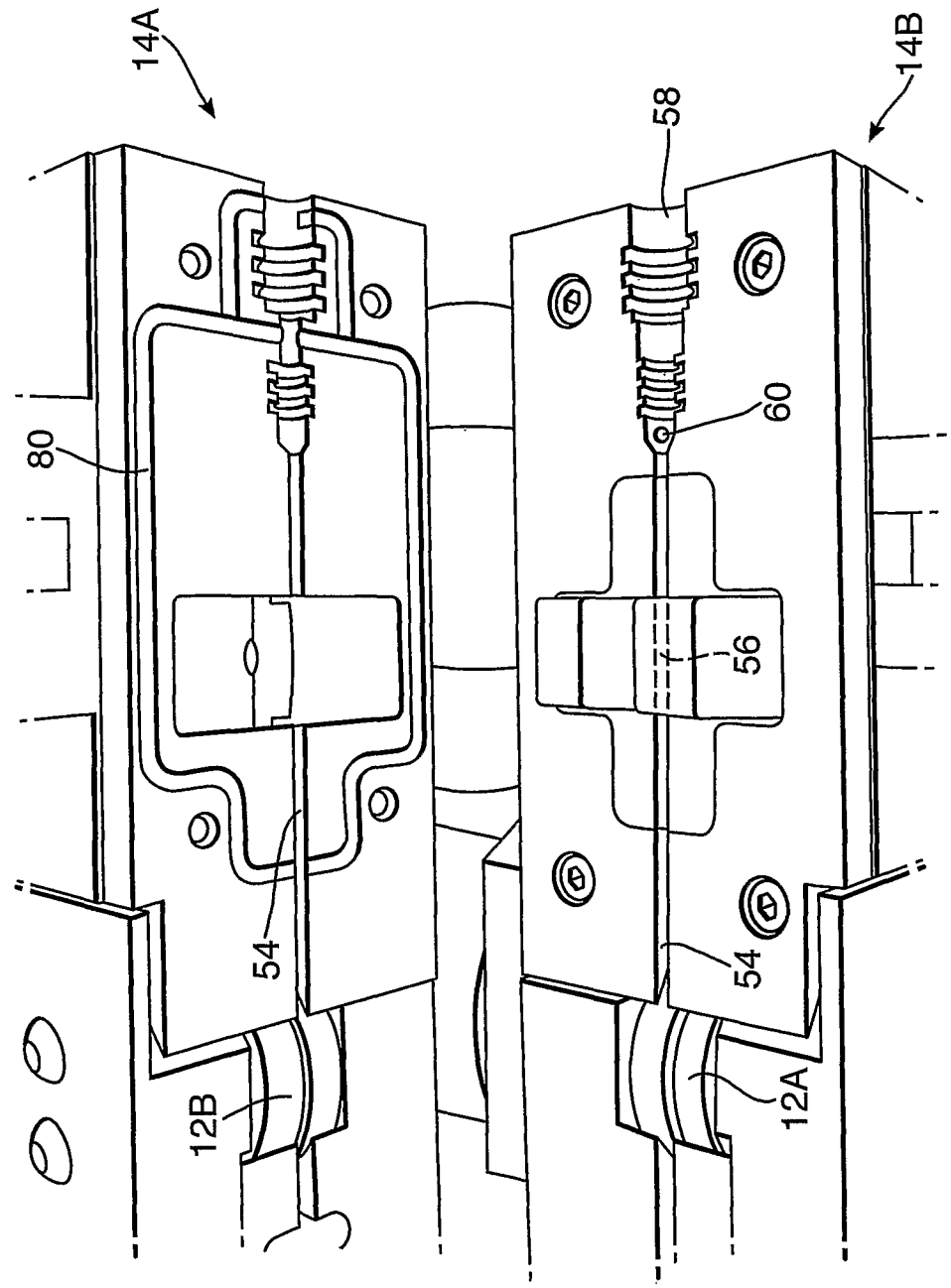
FIG. 11 is a detailed view of the air chamber of the prior art blowing head of FIG. 1.

FIG. 11 is a close up view of the air chamber of the prior art blowing head of FIG. 1. The two parts making up the air chamber (14A and 14B) are brought together using the rotary hinge (2), then secured together with the clamp (4). Assembly creates a bore (54) running through the length of the air chamber section. The bore is made from the mating of the two corresponding grooves on the faces 14A and 14B. A deformable seal (80) is provided on the face of part (14A), and when the parts of the chamber are clamped together, it forms a kind of seal around part of the bore, from the tube connector receiving/fibre unit outlet portion, around the buckle cavity section (56), and part of the bore extending from the buckle cavity section to the drive wheel (12A). The level of sealing against air loss—from both the fibre unit inlet and outlet points, and along the sides parallel to the direction of fibre travel—have been found to be wholly inadequate, with the resulting air loss levels described above. This arises in part to the small seal employed, as well as inaccuracies when mating the two grooves owing to possible misalignment of the two parts of the air chamber connected by the rotary hinge.

Figure 12:
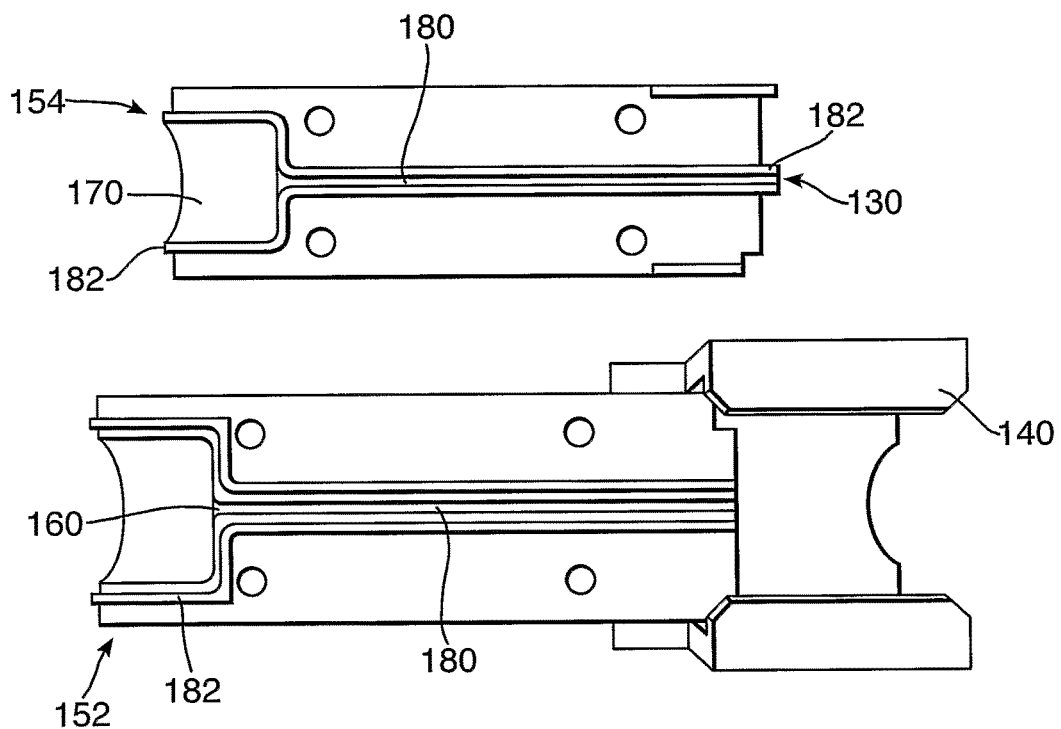
FIG. 12 is detail of the unassembled two parts of an embodiment of an air chamber according to the invention.

FIG. 12 is a view of an unassembled air chamber according to the present invention. It too comprises two parts to allow for bi-directional blowing. The applicants find that using this air chamber reduces the amount of air loss during an installation session significantly by about four times for an installation session under similar conditions (e.g. from about 80 litres a minute, to about 20 litres per minute for a fibre unit with a diameter of 1 mm).

Figure 16:
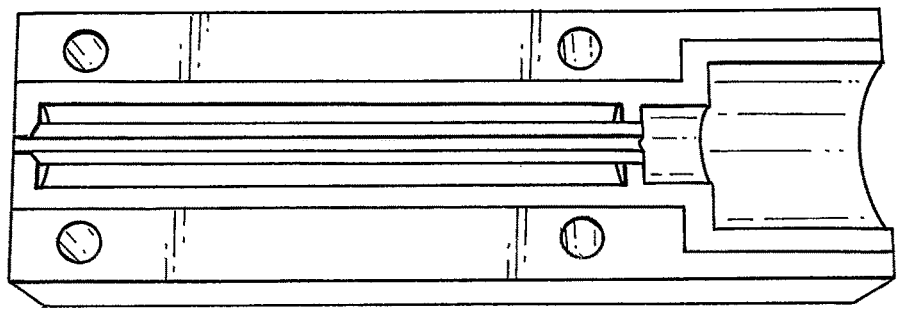
FIG. 16 is a view of the unassembled two parts of another embodiment of an air chamber according to the invention.
Figure 16:
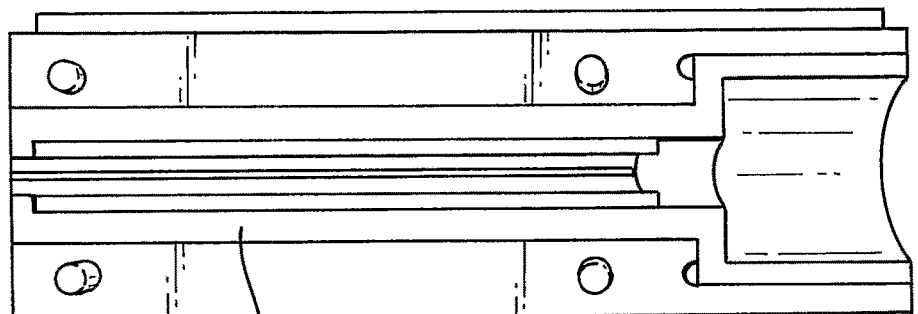

The air chamber can be made from plastic or metal, but preferably the section coming into direct contact with the fibre unit should be a durable material for reasons elaborated below in connection with FIG. 16. The two parts of the air chamber (152, 154) each include a groove or channel (180) along their lengths. The channel terminates at one end in a fibre unit inlet (130) and at the other end in a fibre unit outlet, which also functions as a fibre tube connector receiving portion (170). In this particular embodiment, the tube receiver is adapted to hold a connector which in turn holds the fibre unit tube. An example of a tube connector can be seen in FIG. 4 (98).

When the two parts of the chamber are assembled, the two parts (152, 154) co-operate so that the channels meet together to form a throughbore extending along the length of the chamber. An air inlet, through which air is pumped during an installation session, is provided in air chamber part (152). The air inlet comprises an air inlet bore which communicates with the throughbore a junction (160).

As can be seen from FIG. 12, the dimensions of the throughbore change at the junction of the air inlet bore (160) and the rest of the throughbore on chamber part (152). The section leading from the mouth of the fibre inlet to the junction (the "fibre inlet bore section") is relatively long and narrow; the fibre tube connector receiving portion (170) on the other hand is much shorter and wider. The proportions of the fibre tube connector receiving portion is in part dictated by the size of current tube connectors (typical off-the-shelf connectors having dimensions ranging from 3 to 10 mm). However the relative sizes of the two sections of the throughbore are also deliberately proportioned to create greater air resistance along the fibre inlet bore section, thus encouraging the pumped air to flow in the direction of the shorter and broader tube connector receiving portion and thus into the fibre tube, rather than along the long narrow fibre inlet bore.

The following is a table showing the levels of air loss for various combinations of dimensions for the fibre inlet bore section, based on tests using a fibre of diameter 1 mm in the air chamber of FIG. 12.

| Pressure (bar) | 1.08 mm/ 12. mm | 1.08 mm/ 25 mm | 1.08 mm/ 50 mm | 1.08 mm/ 75 mm | 1.18 mm/ 12.5 mm | 1.18 mm/ 25 mm | 1.18 mm/ 50 mm | 1.18 mm/ 75 mm |
|---|---|---|---|---|---|---|---|---|
| 7 | 7.5 | — | 4.3 | 2.9 | 22.5 | 16.7 | 13 | 8.2 |
| 7.5 | 8 | — | 4.7 | 3 | 25.6 | 17.7 | 14 | 8.9 |
| 8 | 8.5 | — | 4.95 | 3.3 | 27 | 18.7 | 14.9 | 9.3 |
| 8.5 | 9 | 7 | 5.2 | 3.5 | 28.4 | 19.7 | 15.8 | 9.9 |
| 9 | 9.6 | 7.5 | 5.5 | 3.8 | 30.2 | 20.9 | 16.7 | 10.5 |
| 9.5 | 10.05 | 7.9 | 5.9 | 4 | 32 | 22 | 17.5 | 11 |
| 10 | 10.7 | 8.25 | 6.1 | 4.2 | 33.9 | 24 | 18.1 | 11.5 |

As can be seen in the test results above, the greatest air loss is experienced in a relatively short, wide bore (the 1.18 mm/12.5 mm combination above), as compared to a longer, reduced bore (1.08 mm/175 mm). Subject to the constraints of physically tooling the channels and allowing sufficient leeway for the fibre to move through the throughbore therefore, the narrower the bore the less room for air to escape. This effect is augmented by increasing the length of the bore.

It can further be observed that all the results in the above table are considerable improvements on the previous air leakage rate of about 80 litres per minute experienced in the prior art blowing head of FIG. 1. While the dimensions of the fibre inlet bore are now much longer and slimmer than the corresponding air chamber section in the prior art blowing head, the applicants have found that this alone did not achieve the greatly improved sealing against air loss. This was instead obtained from a new method to physically seal off the throughbore from the rest of the blowing head, so as to approximate the same low levels of leakage as would be for a "non-splittable" air chamber. As discussed above, air loss in a unitary "non-splittable" air chamber is experienced primarily at the fibre unit inlet and outlet points.

FIG. 12 shows how the channels of each section are not merely grooved into the face of the air chamber faces as was the case in the prior art blowing head. The channels are here further framed on each side by a continuous wall (182) extending the length of air chambers, and in part defining the channels.

Figure 13:
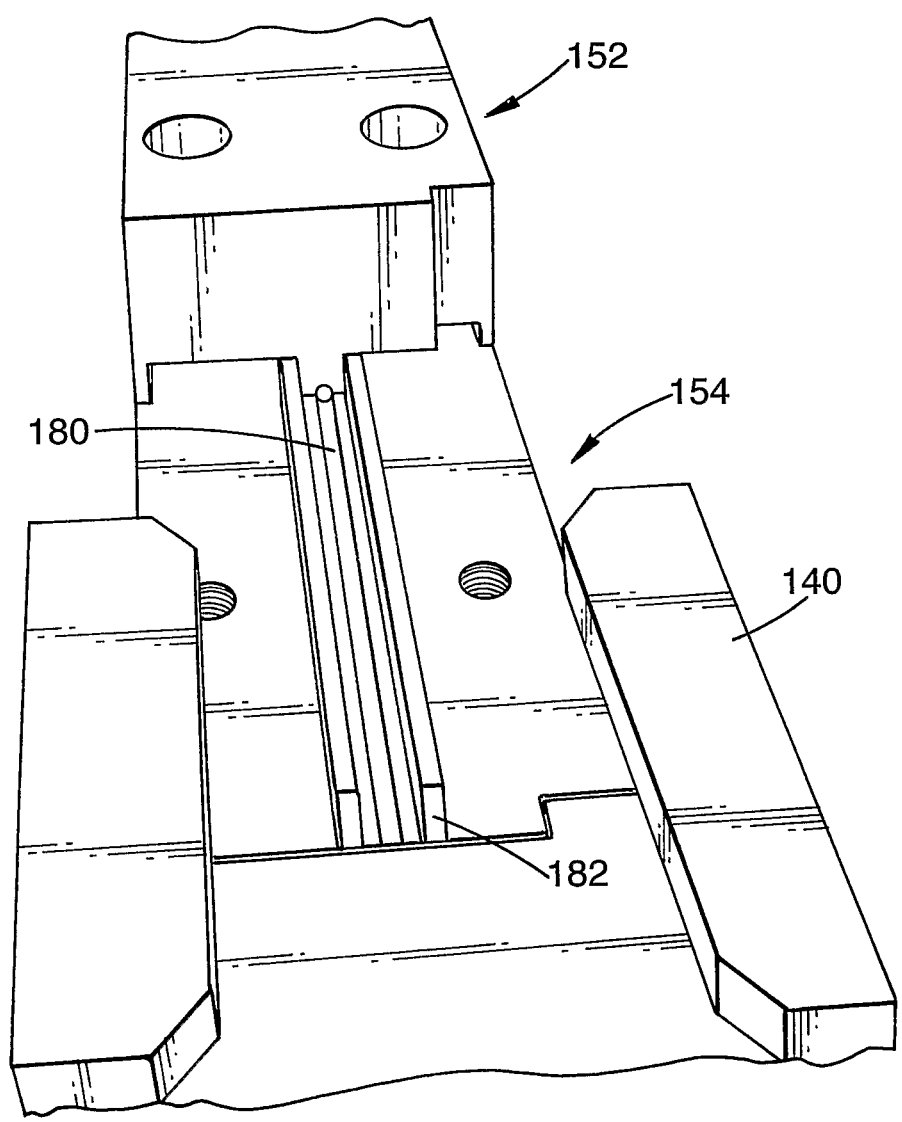
FIG. 13 is a view of the air chamber of FIG. 12, showing the detailed engagement of the two parts during assembly.

FIG. 13 is a close-up view of how the two sections of the chamber (152 and 154) can fit together. When assembled, the walls of each chamber section engage very closely—the resulting throughbore is defined very precisely within the four walls coupled in this manner. In the embodiment shown, the channel of air chamber part (152) is dimensioned more widely in cross section than the corresponding channel on part (154). This allows the channel of part (154) to fit within the channel of part (152). Variations on the topography of the walls (182) are of course possible.

Figure 14A:
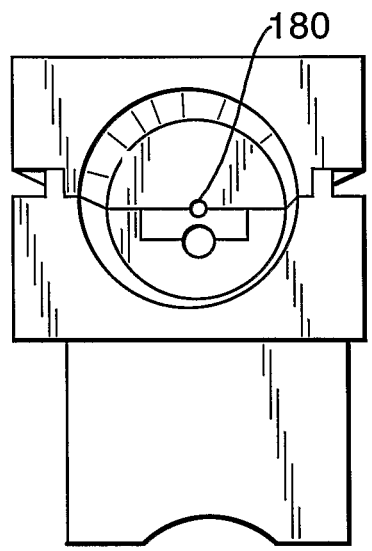
FIGS. 14A and 14B are respectively views of the fibre unit outlet end, and the fibre unit inlet end of the assembled air chamber of FIG. 12.
Figure 14B:
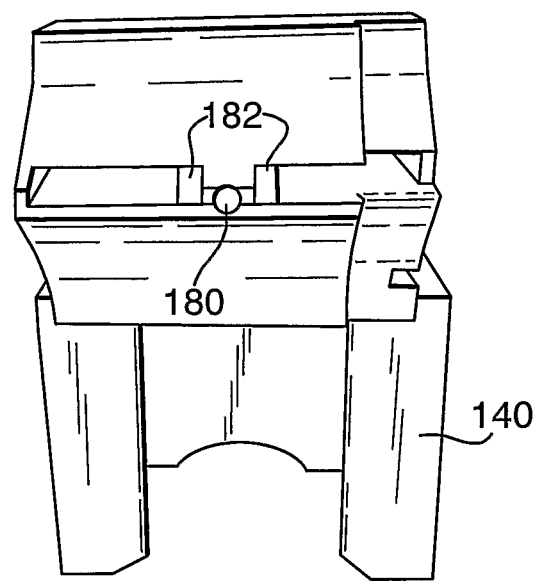

FIGS. 14A and 14B are views of the assembled air chamber, respectively from the fibre tube connector receiving end, and fibre unit inlet end. This views show the close definition of the throughbore created by the walls (182).

Figure 15A:
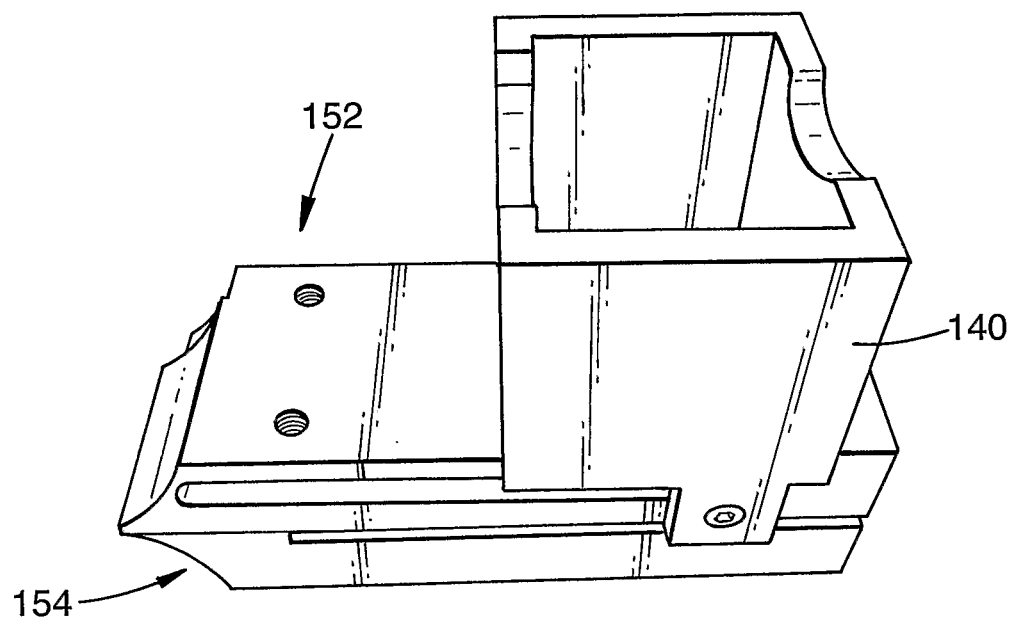
FIGS. 15A and 15B are further views of the assembled air chamber of FIG. 12.
Figure 15B:
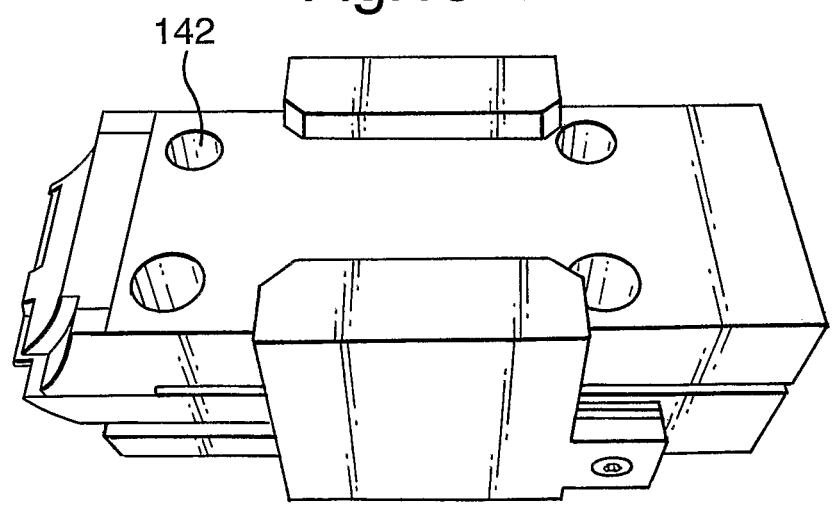

After assembly, the air chamber is secured together by screws (shown in FIG. 3 102) driven through the screw holes (142). Additional clamping is provided by a separate clamp (140), more clearly shown in operation in FIGS. 15A and 15B. The exactness of the fit of the walls (182) of the channels to create the throughbore, together with the closeness of the securing mechanism, creates in effect an air chamber approximating the characteristics of a unitary chamber formed from a single piece of material, with only marginally more air loss, which takes place, in the main, at the fibre inlet and tube receiving sections. Advantageously, this air chamber can be used for bi-directional blowing.

By sealing the throughbore itself (instead of remotely around the bore as in the prior art air chamber of FIG. 11), the current air chamber is able to retain more air within the chamber to be diverted down into the fibre tube. In an alternative embodiment, the sealing can be achieved by deploying deformable seals (184) around the throughbore instead of using channels defined by walls (182) along the air chamber. FIG. 16 depicts an embodiment of this idea.

As noted above, rubber-based seals are highly prone to wear by the glass microspheres coating the fibre travelling at speeds of up to a meter per second. It has been found that use of the prior art blowing head, the seal (80 in FIG. 11) coming into contact with the moving fibre unit was especially prone to the cutting effects of the glass. The need for frequent replacement is at odds with the need for cheap blowing apparatus and techniques, so while sealing the air chamber with a deformable material is a valid embodiment of the invention, the preferred method is to use the walls of the channels to create a tightly-defined throughbore, as it is made of a more durable material.

It should also be noted that the use of separate halves of the blowing head which are not hinged together as in the prior art but rather are linearly assembled together using fixing pins extending perpendicular to the mating surfaces of the two halves of the blowing head enables a much better fit to be made to the mating surfaces, and it avoids any shearing forces against the mating surfaces which could damage the mating parts. In this way, a very good seal can be formed even without using a deformable seal, which, as noted above, tends to deteriorate quickly in the harsh conditions experienced within a blowing head during operation.

To improve sealing further, whilst reducing the exposure of a deformable seal to the harsh conditions of high pressure, micro-seals and shear forces, a deformable seal can be used together with a non-deformable seal, with the deformable material being located away from the direct cutting effect of the glass-coated fibre. This maintains the advantages of linear assembly which reduces shear stress on the deformable seal, and the non-deformable seal is somewhat protected from the effect of the microspheres by the non-deformable seal (which is naturally much tougher than the deformable seal).

The skilled person will realise that further various alternatives and combinations are possible within the scope of the invention.

The invention claimed is:

1. A blowing head for installing blown cable, comprising:
   a low-inertia motor using electrical current, configured to obtain the advance of the cable within the blowing head,
   a low-inertia sensor configured to sense movement and changes in the level of movement of the cable within the blowing head, and
   a control unit for controlling installation of the cable, the control unit being configured to capture the level of the electrical current required to start movement of the cable to calculate a cap on the current level, and use the current level cap to prevent excessive pushing on the cable by the motor during an installation session.

2. A blowing head in accordance with claim 1 wherein the current level cap is discarded after end of each installation session.

3. A blowing head in accordance with claim 1 including a rotary encoder operatively connected to the motor, wherein the current required to start movement of the cable within the blowing head is configured to be detected by detecting movement of the rotary encoder.

4. A blowing head in accordance with claim 1, wherein the sensor includes two drive wheels configured to pass the cable between and in contact with the wheels during an installation session.

5. A blowing head in accordance with claim 1, wherein each of the wheels are separately and operatively connected to the motor.

6. A blowing head in accordance with claim 5, wherein the wheels do not touch each other.

7. A system for installing cable into a cable tube, comprising:
   a low-inertia motor using electrical current, configured to obtain the advance of the cable within the blowing head,
   a low-inertia sensor configured to sense movement and changes in the level of movement of the cable within the blowing head, and
   a control unit for controlling installation of the cable, the control unit being configured to capture the level of the electrical current required to start movement of the cable to calculate a cap on the current level, and use the current level cap to prevent excessive pushing on the cable by the motor during an installation session.

8. A system in accordance with claim 7, wherein the current level cap is discarded after end of each installation session.

9. A system in accordance with claim 7, wherein the sensor comprises two drive wheels which lightly touch each other or do not touch each other.

10. A method for installing blown cable in an installation session using the blowing head of claim 1, comprising the steps of:
   (i) inserting an end of a cable into the blowing head,
   (ii) increasing the level of current to the motor until the cable has started to advance through the blowing head, and
   (iii) setting a current level cap for the motor during the installation session, based at least partly on the level of current obtained in step (ii).

11. A method in accordance to claim 10, further including discarding the current level cap after end of each installation session.

12. A blowing head for installing cable into a cable tube, the blowing head comprising:
   a motor using electrical current, configured to obtain movement of the cable within the blowing head;
   a sensor configured to sense movement of the cable within the blowing head; and
   a processor, coupled to the motor and the sensor, configured to:
      vary the level of current of the motor used by the motor in response to changes in the level of movement sensed by the sensor;
      determine the level of current required to start the movement of the cable;
      determine a cap on the level of current based on the level of current required to start the movement of the cable; and
      use the cap of the level of current to prevent excessive pushing by the motor on the cable during installation of the cable.

13. A blowing head in accordance with claim 12 wherein, when used during a blown cable installation session, the processor is configured to determine the cap on the level of current at the start of the installation session so that the processor can later use the determined cap during the installation session.

14. A blowing head in accordance with claim 12, wherein the processor is configured to determine the cap on the level of current by adding a predetermined percentage of current to the level of current required to start the movement of the cable .

15. A blowing head in accordance with claim 12 further comprising a rotary encoder operatively connected to the motor, wherein the current required to start movement of the cable within the blowing head is configured to be detected by detecting movement of the rotary encoder.

16. A blowing head in accordance with claim 12, wherein the sensor includes a sensing wheel configured to pass the cable by and in contact with the wheel during an installation session.

17. A blowing head in accordance with claim 12, wherein the sensor comprises two drive wheels which lightly touch each other or do not touch each other.

18. A method for installing blown cable in an installation session using a blowing head having a motor, the method comprising:
   inserting an end of a cable into the blowing head,
   increasing a level of electrical current to the motor until the cable has started movement through the blowing head,
   determining the level of current for starting the movement of the cable,
   setting a cap on the level of current to be used by the motor during the installation session, based at least partly on the determined level of current for starting the movement of the cable, and
   operating the motor, using the cap on the level of current, to install the cable during the installation session to prevent excessive pushing on the cable by the motor during the installation session.

19. A method as in claim 18 wherein the cap is set at the start of the installation session so that the set cap can be later used during the installation session.

20. A method as in claim 18 wherein the cap is set by adding a predetermined percentage of current to the determined level of current for starting the movement of the cable.

21. A method as in claim 18, further comprising sensing movement and changes in the level of movement of the cable within the blowing head using a low-inertia sensor comprising two drive wheels which lightly touch each other or do not touch each other.

22. A blowing head for installing blown cable, comprising:
   a low-inertia motor using electrical current, configured to obtain the advance of the cable within the blowing head,
   a low-inertia sensor comprising two drive wheels which lightly touch each other or do not touch each other, configured to sense movement and changes in the level of movement of the cable within the blowing head, and
   a control unit configured to control installation of the cable.

23. A blowing head in accordance with claim 22 wherein the control unit is configured to capture the level of the electrical current required to start movement of the cable to calculate a cap on the current level, wherein the current level cap is configured to be used to prevent excessive pushing on the cable by the motor during an installation session.

24. A blowing head in accordance with claim 23 wherein the current level cap is discarded after end of each installation session.

25. A blowing head in accordance with claim 23 including a rotary encoder operatively connected to the motor, wherein the current required is configured to start movement of the cable within the blowing head is detected by detecting movement of the rotary encoder.

26. A blowing head in accordance with claim 22 wherein during an installation session, the fiber passes between and in contact with the two wheels.

27. A blowing head in accordance with claim 22, wherein each of the wheels are separately and operatively connected to the motor.

* * * * *